US008818664B2

(12) United States Patent
Lado et al.

(10) Patent No.: US 8,818,664 B2
(45) Date of Patent: Aug. 26, 2014

(54) METHOD AND APPARATUS FOR SELECTING AN ENGINE OPERATING STATE FOR A MULTI-MODE POWERTRAIN SYSTEM

(75) Inventors: Samantha Victoria Lado, Pittsfield Township, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 13/570,175

(22) Filed: Aug. 8, 2012

(65) Prior Publication Data
US 2014/0046556 A1 Feb. 13, 2014

(51) Int. Cl.
*B60K 17/06* (2006.01)

(52) U.S. Cl.
USPC .............................. 701/54; 701/25

(58) Field of Classification Search
USPC ....................................... 701/54, 25
See application file for complete search history.

(56) References Cited

U.S. PATENT DOCUMENTS 7,645,206 B2 1/2010 Holmes et al.
2010/0179009 A1 7/2010 Wittkopp et al.

OTHER PUBLICATIONS

U.S. Appl. No. 13/570,175, Lado, et al.
U.S. Appl. No. 13/569,929, Diaz, et al.
U.S. Appl. No. 13/568,086, Heap, et al.
U.S. Appl. No. 13/568,070, Heap, et al.
U.S. Appl. No. 13/571,070, Heap, et al.
U.S. Appl. No. 13/568,071, Kim, et al.
U.S. Appl. No. 13/568,083, Heap, et al.

*Primary Examiner* — Mary Cheung
*Assistant Examiner* — Yuen Wong

(57) ABSTRACT

A powertrain system includes a multi-mode transmission configured to transfer torque among an engine, torque machines, and a driveline. A method for controlling operation of the powertrain system includes determining a bias engine speed based upon an engine speed. A search is executed including determining a respective candidate power cost for operating the powertrain system in response to an output torque request, and determining a respective candidate driveability cost for the candidate engine speed based upon the bias engine speed. The search also selects one of the candidate engine speeds and candidate engine torques that achieves a minimum of a combination of the respective candidate driveability cost and the respective candidate power cost as a preferred engine speed and preferred engine torque. Operation of the powertrain system is controlled based upon the preferred engine speed and preferred engine torque.

9 Claims, 3 Drawing Sheets

US 8,818,664 B2

METHOD AND APPARATUS FOR SELECTING AN ENGINE OPERATING STATE FOR A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes a multi-mode transmission configured to transfer torque among an engine, torque machines, and a driveline. A method for controlling operation of the powertrain system includes, for each of a plurality of loop cycles, determining a bias engine speed based upon an engine speed for an immediately previous loop cycle and based upon an expected change in the engine speed. A search is executed including, for each of a plurality of candidate engine speeds and candidate engine torques, determining a respective candidate power cost for operating the powertrain system in response to an output torque request, and determining a respective candidate driveability cost for the candidate engine speed based upon the bias engine speed. The search also selects one of the candidate engine speeds and candidate engine torques that achieves a minimum of a combination of the respective candidate driveability cost and the respective candidate power cost as a preferred engine speed and preferred engine torque. Operation of the powertrain system is controlled based upon the preferred engine speed and preferred engine torque.

BRIEF DESCRIPTION OF THE DRAWINGS

One or more embodiments will now be described, by way of example, with reference to the accompanying drawings, in which.

DETAILED DESCRIPTION

Figure 1:
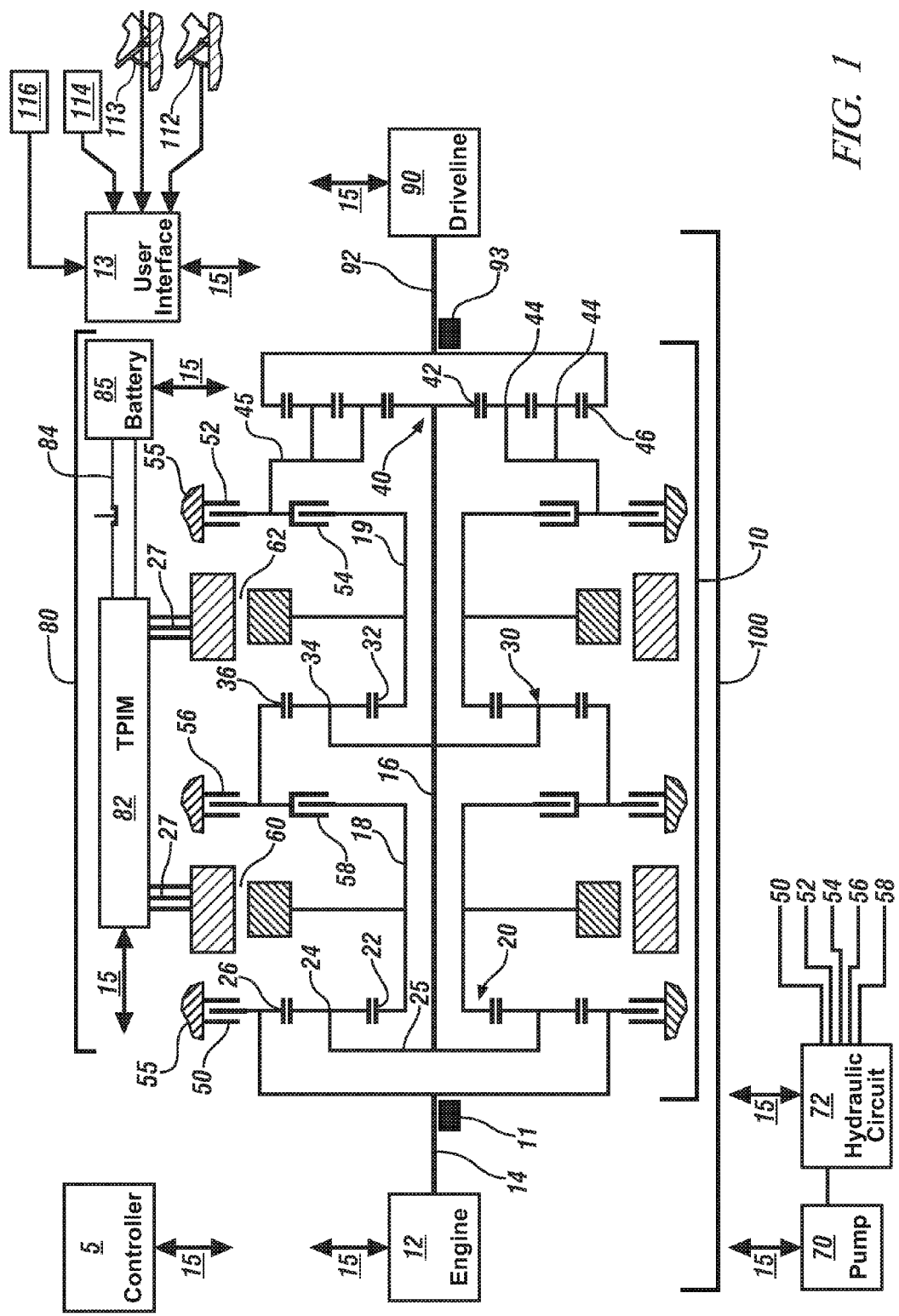
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10.

A rotational speed sensor 11 monitors crank angle and rotational speed of the input member 14. Power output from the engine 12, i.e., rotational speed and engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. The control routines may be executed in loop cycles at regular intervals, for example each 3.125, 6.25, 12.5, 25 and 100 milliseconds during ongoing engine and vehicle operation. Alternatively, the control routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | | x | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | | x | x | x |
| EV1 | OFF | x | | x | | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | ON(ALL/DEAC/FCO)/OFF | | | x | x | |
| PseudoGear 3 | ON(ALL/DEAC/FCO)/OFF | x | x | | | |
| Neutral | OFF | | | x | | x |
| Neutral | OFF | | | | x | x |

The powertrain system 100 described with regard to FIG. 1 is illustrative, and can be controlled using an embodiment of a search scheme 200 as described with reference to FIGS. 2, 3, and 4. Alternatively, other powertrain systems having operating systems and characteristics analogous to those described with reference to FIG. 1 may be employed. The search scheme 200 includes a method for operating a powertrain system including a multi-mode transmission configured to transfer torque between an engine, torque machines, and a driveline. The method includes executing a search to determine a preferred engine operating point for operating the powertrain system in a transmission range in response to an output torque request, wherein the search includes determining a power cost and determining an engine speed driveability cost associated with operating the powertrain system in response to the output torque request for each of a plurality of candidate engine speeds and candidate engine torques. A preferred engine operating point is selected as the candidate engine speed and the candidate engine torque associated with a minimum of the power costs and engine speed driveability costs. Operation of the engine can be controlled at the preferred engine operating point.

Figure 2:
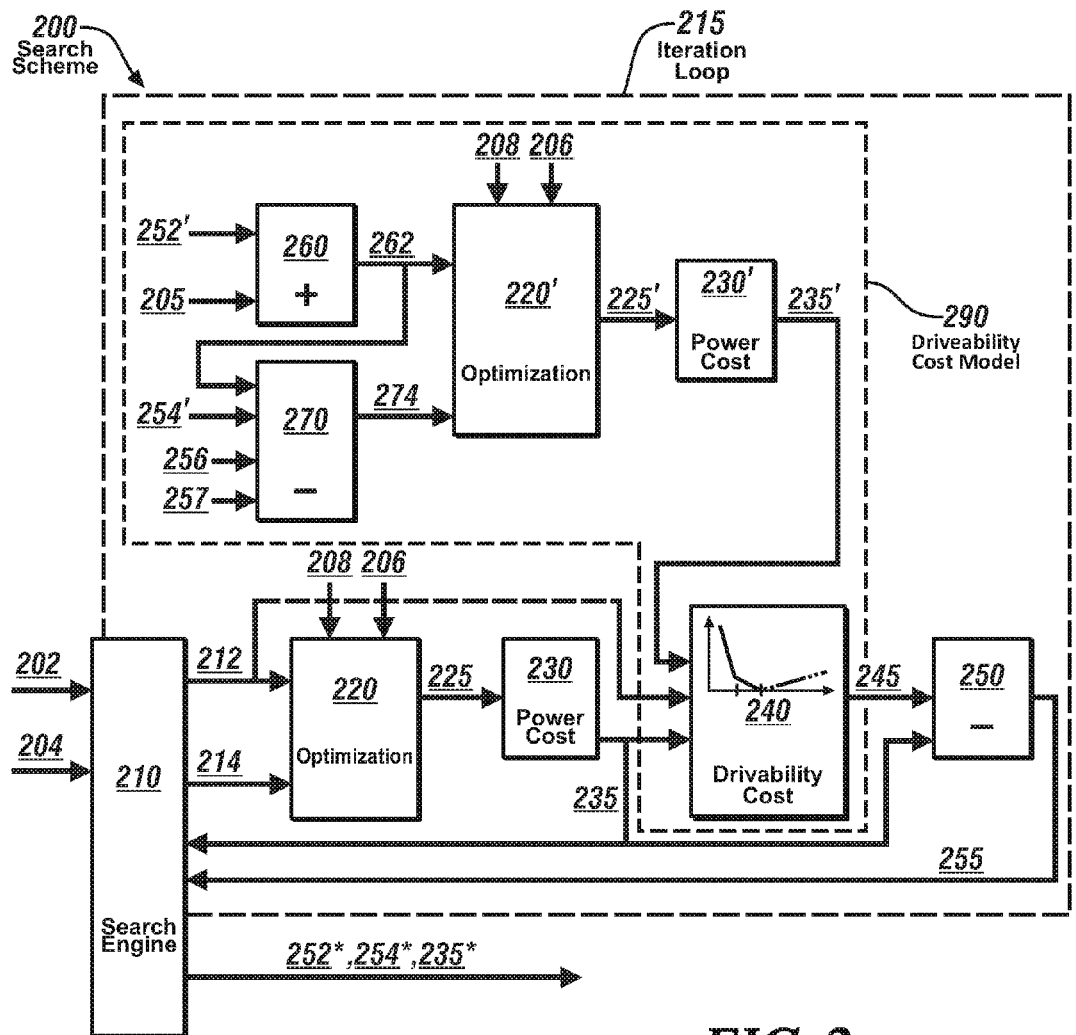
FIG. 2 illustrates a search scheme to determine a preferred engine speed and a preferred engine load based upon power costs and engine speed driveability costs, in accordance with the disclosure.

FIG. 2 schematically shows the search scheme 200 for determining the preferred engine operating point for operating a multi-mode powertrain system in a selected transmission range in response to an output torque request 206. The search scheme 200 periodically executes, e.g., during one of the loop cycles, to determine a preferred engine operating point including a preferred engine speed 252* and a preferred engine torque 254* that corresponds to a minimum total power cost 255* for that loop cycle. The search scheme 200 includes determining an engine speed range 202 and an engine torque range 204. The engine speed range 202 and engine torque range 204 may encompass an entire achievable speed/torque operating range for the engine, or may encompass a restricted portion of the entire achievable speed/torque operating range for the engine. The entire achievable speed/torque operating range for the engine can include an engine speed range 202 that includes zero speed, i.e., the engine not spinning, and traverses from an engine idle speed, e.g., 800-1000 RPM, to a maximum achievable engine speed, i.e., redline. The maximum achievable engine speed is specific to an engine configuration and can be in the range of 5000 RPM to 8000 RPM. Similarly, the engine torque range 204 can traverse from a negative torque value associated with engine pumping, e.g., −50 Nm, to a maximum engine torque output in response to high load operating conditions, e.g., >300 Nm in one embodiment. The maximum speed and torque values are provided for purposes of illustration. The engine speed range 202 and engine torque range 204 are provided as inputs to a search engine 210.

The search engine 210 preferably includes a two-dimensional search engine (search engine) 210 that iteratively generates a plurality of candidate engine speeds Ne(j) 212 across the engine speed range Ne 202 and a plurality of candidate engine torques Te(j) 214 across the engine torque range 204, each which is input to an iteration loop 215. The iteration loop 215 includes an optimization segment 220, a power cost model 230, and an engine speed driveability cost model 290.

The search engine 210 employs a suitable search method to iteratively generate the plurality of candidate engine speeds Ne(j) 212 across the engine speed range Ne 202 and the plurality of candidate engine torques Te(j) 214 across the engine torque range 204. In one embodiment the candidate engine speeds Ne(j) 212 encompass engine speeds of idle, 1500 RPM, 2000 RPM, 2500 RPM, and 3500 RPM, and 4500 RPM. In one embodiment the plurality of candidate engine torques Te(j) 214 encompass torques of −50 Nm, 0 Nm, 50 Nm, 100 Nm, 150 Nm, 250 Nm, and 300 Nm. The search engine 210 may select and evaluate a plurality of the candidate engine torques Te(j) 214 at each of the candidate engine speeds Ne(j) 212, or may select a subset thereof.

The optimization segment 220 calculates a candidate powertrain operating point 225 including magnitudes of candidate torque commands for the first and second torque machines 60, 62 for controlling the powertrain system 100 in response to the output torque request 206 when the engine 12 is operating at the candidate engine speed Ne(j) 212 and the candidate engine torque Te(j) 214 in one of the transmission ranges. The optimization scheme 220 employs the candidate engine speed Ne(j) 212, the candidate engine torque T(j) 214, the output torque request 206, and powertrain system operating parameters 208 to determine the candidate powertrain operating point 225 for operating in one of the transmission ranges. The transmission range is a selected one of the transmission ranges described with reference to Table 1 for one embodiment of the powertrain system 100. The powertrain system operating parameters 208 include output speed of the transmission, operating limits for the first and second torque machines 60, 62, e.g., minimum and maximum torques and minimum and maximum speeds, and operating limits for the battery 85, e.g., battery power limits including maximum discharge limits, and maximum charge limits. The candidate powertrain operating point 225 includes preferred operating parameters for the first and second torque machines 60, 62, e.g., torques and speeds, and preferred operating parameters for the battery 85, e.g., battery power, in response to the output torque request 206 when the engine is operating at the candidate engine speed Ne(j) 212 and the candidate engine torque Te(j) 214 in one of the transmission ranges.

The power cost model 230 employs a power cost function to determine a candidate power cost 235 for operating the powertrain system 100 at the candidate powertrain operating point 225. An exemplary power cost function 400 is described with reference to FIG. 4. The candidate power cost 235 is provided to the search engine 210, is input to a driveability cost determination scheme 240, and is employed to determine a minimum total power cost 255* for that loop cycle. The candidate power cost 235 is captured for future use, but not employed by the search engine 210 in determining the preferred engine speed 252* and the preferred engine torque 254*.

The engine speed driveability cost model 290 determines a candidate driveability cost 245 as follows. During a previous loop cycle, the engine operated at a previous engine speed 252' and a previous engine torque 254'. During ongoing operation, an expected change in the engine speed (Ni_dot) 205 for a loop cycle can be determined in response to the output torque request and output speed at the output member of the transmission that is achieved during a previously executed loop cycle. An operator 260 arithmetically combines the expected engine speed change (Ni_dot) 205 and the previous engine speed 252' to determine a bias engine speed 262. The bias engine speed 262 indicates an expected engine speed for the present loop cycle based upon expected operation of the powertrain system as indicated by the expected engine speed change (Ni_dot) 205. A bias engine torque 274 can be determined based upon the previous engine torque 254' in conjunction with an output torque 256 and an output torque request 257 for the previously executed loop cycle. An operator 270 calculates the bias engine torque 274, which includes an expected torque change based upon a difference between the torque request 256 and the output torque request 257 for the previously executed loop cycle divided by the bias engine speed 262. The bias engine torque 274 indicates an expected engine torque for the presently executing loop cycle.

The bias engine speed 262 and the bias engine torque 274 are employed by an optimization segment 220' to calculate a driveability operating point 225' including magnitudes of candidate torque commands for the first and second torque machines 60, 62 for controlling the powertrain system 100 in response to the output torque request 206 when the engine 12 is in the selected transmission range. The optimization scheme 220' employs the bias engine speed 262, the bias engine torque 274, the output torque request 206, and the powertrain system operating parameters 208 to determine the driveability operating point 225' for operating in the transmission range. The powertrain system operating parameters 208 have been previously described, and include output speed of the transmission, operating limits for the first and second torque machines 60, 62, e. g., minimum and maximum torques and minimum and maximum speeds, and operating limits for the battery 85, e.g., battery power limits including maximum discharge limits, and maximum charge limits. The driveability operating point 225' includes preferred operating parameters for the first and second torque machines 60, 62, e.g., torques and speeds, and preferred operating parameters for the battery 85, e.g., battery power, in response to the output torque request 206 when the engine is operating at the bias engine speed 262 and the bias engine torque 274 in the selected transmission range. The power cost model 230' employs the power cost function 400 described with reference to FIG. 4 to determine an engine speed driveability cost 235' for the driveability operating point 225'. The engine speed driveability cost 235' is provided as input to the driveability cost determination scheme 240.

Figure 3:
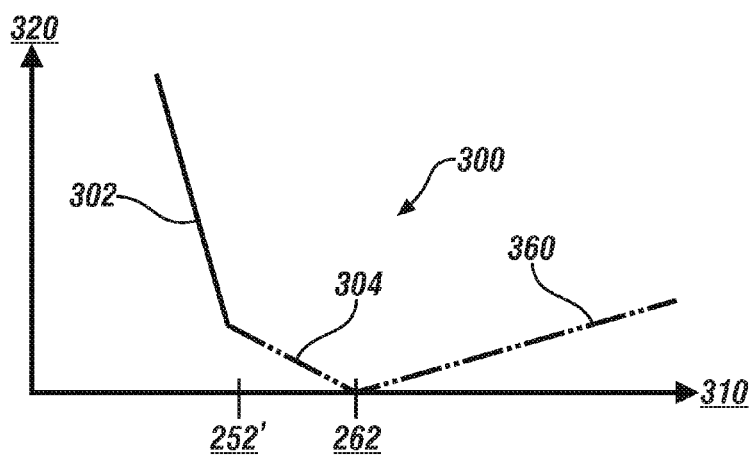
FIG. 3 illustrates an embodiment of a driveability cost calibration for determining an engine speed driveability cost in relation to engine speed, in accordance with the disclosure.

The driveability cost determination scheme 240 is employed to determine the candidate driveability cost 245 for the candidate engine speed Ne(j) 212 based upon the engine speed driveability cost 235' and the candidate power cost 235, with such operation graphically shown with reference to FIG. 3. The driveability cost determination scheme 240 employs a driveability cost calibration 300 to select the candidate driveability cost 245 for each iteration of the search engine 210 as the magnitude of the driveability cost that corresponds to the candidate engine speed Ne(j) 212. Operator 250 arithmetically combines the candidate driveability cost 245 and the candidate power cost 235 to determine a total power cost 255 for controlling the powertrain system 100 in response to the output torque request 206 when the engine 12 is operating at the candidate engine speed Ne(j) 212 and the candidate engine torque Te(j) 214 in one of the transmission ranges.

The search engine 210 generates multiple outputs each loop cycle. The search engine 210 determines the preferred engine speed 252* and the preferred engine torque 254* for controlling the engine 12 that corresponds to the minimum total power cost 255* for controlling the powertrain system 100 in response to the output torque request 206 when operating in the transmission range. The search engine also generates a preferred power cost 235*, which is the minimum of the candidate power costs 235 for controlling the powertrain system 100 in response to the output torque request 206 when operating in the transmission range. Another control scheme can evaluate the preferred power cost 235* in comparison with other preferred power costs associated with operating the powertrain system in other transmission ranges to select a preferred transmission range.

FIG. 3 graphically shows an embodiment of the driveability cost calibration 300 for determining an engine speed driveability cost in relation to engine speed. Cost is shown on the y-axis 320 and engine speed is shown on the x-axis 310. The speed points of interest include the engine speed from the previous loop cycle 252' and the bias engine speed 262. The magnitudes of the points of the driveability cost calibration 300 are based upon the engine speed driveability cost 235' and the candidate power cost 235. The driveability cost calibration 300 includes a driveability cost of zero at the bias engine speed 262, indicating that when the candidate engine speed Ne(j) 212 equals the bias engine speed 262, there is no additional cost associated with operating the engine to achieve the candidate engine speed Ne(j) 212, i.e., there is no additional penalty for achieving the operating point.

The driveability cost calibration 300 includes a first section 302, a second section 304, and a third section 360. The first section 302 encompasses speeds that are opposite to the direction of the desired change in engine speed indicated by the bias engine speed 262 in relation to the engine speed from the previous loop cycle 252', with the driveability costs increasing at a steep rate corresponding to the increase in the desired change in engine speed associated with the candidate engine speed Ne(j) 212 opposite to the direction of the desired change in engine speed associated with the bias engine speed 262. The second section 304 encompasses speeds that are between the bias engine speed 262 and the engine speed from the previous loop cycle 252', with the driveability costs decreasing corresponding to the increase in the desired change in engine speed associated with the candidate engine speed Ne(j) 212 in the direction of the bias engine speed 262. The third section 360 encompasses speeds that are greater than the bias engine speed 262, with the driveability costs increasing corresponding to the increase in the desired change in engine speed associated with the candidate engine speed Ne(j) 212 greater than the bias engine speed 262. The rate of change in the driveability costs in the first section 302 is substantially greater than the rate of change in driveability costs in the second section 304 and the third section 360 to reflect that an expected change in engine speed preferably directionally aligns with operator expectations. The rate of change in the driveability costs is intended to more heavily penalize engine speed changes that are counter-intuitive to the operator expectation while still accounting for and increasing system efficiency. The driveability cost determination scheme 240 employs the driveability cost calibration 300 to select the candidate driveability cost 245 for each iteration of the search engine 210 as the magnitude of the driveability cost that corresponds to the candidate engine speed Ne(j) 212.

Figure 4:
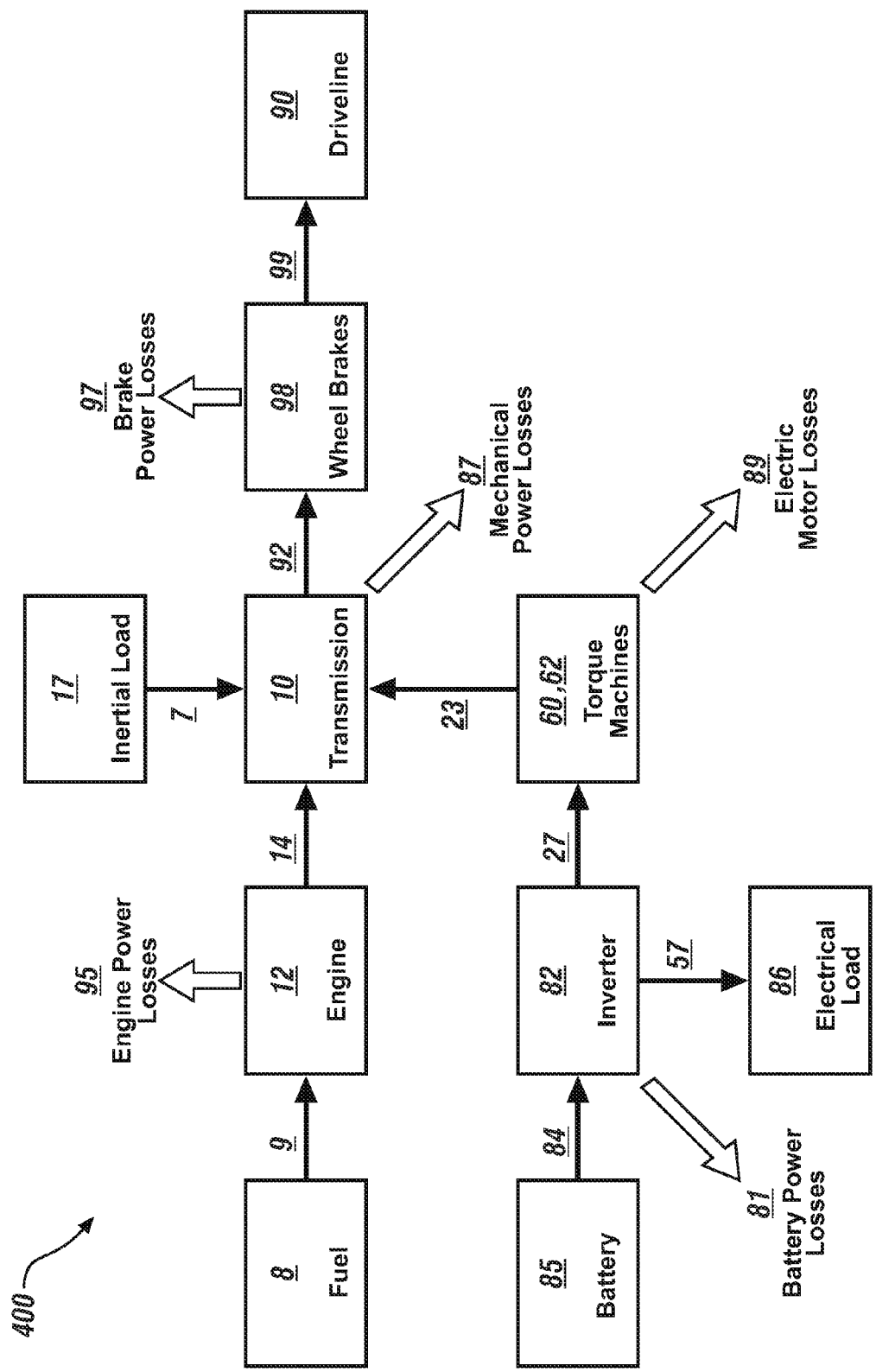
FIG. 4 illustrates an exemplary power cost function including an analytic framework for determining powertrain system operating costs, in accordance with the disclosure.

FIG. 4 schematically illustrates an exemplary power cost function 400 including an analytic framework for determining powertrain system operating costs, including the aforementioned powertrain operating costs 235 and 235'. The power cost function 400 is described with reference to the multi-mode powertrain system 100 described with reference to FIG. 1. Powertrain elements include engine 12, transmission 20, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 between the wheel brakes 98 and the driveline 90. Power losses include engine power losses 95, battery power losses 81, mechanical power losses 87, electric motor losses 89, and brake power losses 97. The power cost inputs to the power cost function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 12 and the non-combustion torque machines 60, 62. The power cost function 400 may be employed to determine a total power cost for operating at a selected engine operating point over the range of engine operation. The driveability cost 245 permits the search engine 210 to comprehend energy costs associated with changing magnitude and direction of the engine speed and also comprehends driveability effects of changing magnitude and direction of the engine speed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling operation of a powertrain system including a multi-mode transmission configured to transfer torque among an engine, torque machines, and a driveline, the method comprising, for each of a plurality of loop cycles:
   determining a bias engine speed based upon an engine speed for an immediately previous loop cycle and based upon an expected change in the engine speed for an immediately previous loop cycle; and
   executing a search, comprising:
      for each of a plurality of candidate engine speeds and candidate engine torques:
         determining a respective candidate power cost for operating the powertrain system in response to an output torque request, and
         determining a respective candidate driveability cost for the candidate engine speed based upon the bias engine speed;
      selecting one of the candidate engine speeds and candidate engine torques that achieves a minimum of a combination of the respective candidate driveability cost and the respective candidate power cost as a preferred engine speed and preferred engine torque; and
   controlling operation of the powertrain system based upon the preferred engine speed and preferred engine torque.

2. The method of claim 1, wherein determining the respective candidate driveability cost for the candidate engine speed based upon the bias engine speed comprises:
   determining an engine speed driveability cost based upon the bias engine speed; and
   determining the respective candidate driveability cost based upon the engine speed driveability cost and the candidate power cost for the candidate engine speed.

3. The method of claim 2, wherein the respective candidate driveability cost equals zero when the candidate engine speed equals the bias engine speed.

4. The method of claim 2, wherein the respective candidate driveability cost increases at a greater rate when the candidate engine speed is opposite in direction to the expected change in the engine speed compared to when the candidate engine speed is in the same direction as the expected change in the engine speed.

5. A method for controlling operation of a powertrain system including a multi-mode transmission configured to transfer torque among an engine, torque machines, and a driveline, the method comprising, for each of a plurality of loop cycles:
   determining a bias engine speed based upon an engine speed for an immediately previous loop cycle and an expected change in the engine speed for an immediately previous loop cycle and determining an engine speed driveability cost; and
   executing a search, comprising:
      for each of a plurality of candidate engine operating points including candidate engine speeds:
         determining a respective candidate power cost for operating the powertrain system in response to an output torque request, and
         determining a respective candidate driveability cost for the candidate engine speed based upon the bias engine speed;
      selecting one of the candidate engine operating points that achieves a minimum of a combination of the respective candidate driveability cost and the candidate power cost as a preferred engine operating point; and
   controlling operation of the powertrain system based upon the preferred engine operating point.

6. The method of claim 5, wherein determining the respective candidate driveability cost for the candidate engine speed based upon the bias engine speed comprises:
   determining an engine speed driveability cost based upon the bias engine speed and a bias engine torque; and
   determining the respective candidate driveability cost based upon the engine speed driveability cost and the candidate power cost for the candidate engine speed.

7. The method of claim 6, wherein the respective candidate driveability cost equals zero when the candidate engine speed equals the bias engine speed.

8. The method of claim 6, wherein the respective candidate driveability cost increases at a greater rate when the candidate engine speed is opposite in direction to the expected change in the engine speed compared to when the candidate engine speed is in the same direction as the expected change in the engine speed.

9. A method for controlling operation of a powertrain system including a multi-mode transmission configured to transfer torque among an engine, torque machines, and a driveline, the method comprising, for each of a plurality of loop cycles:
   determining a bias engine speed based upon an engine speed for an immediately previous loop cycle and an expected change in the engine speed for an immediately previous loop cycle and determining an engine speed driveability cost; and
   executing a search, comprising:
      for each of a plurality of candidate engine operating points including candidate engine speeds:

determining a respective candidate power cost for operating the powertrain system in a transmission range in response to an output torque request, and determining a respective candidate driveability cost for the candidate engine speed based upon the bias engine speed;

selecting one of the candidate engine operating point that achieves a minimum of a combination of the respective candidate driveability cost and the respective candidate power cost as a preferred engine operating point for operating the powertrain system in the transmission range in response to the output torque request; and controlling operation of the powertrain system in the transmission range in response to the output torque request including controlling the engine at the preferred engine operating point.

* * * * *